United States Patent Office 2,944,987
Patented July 12, 1960

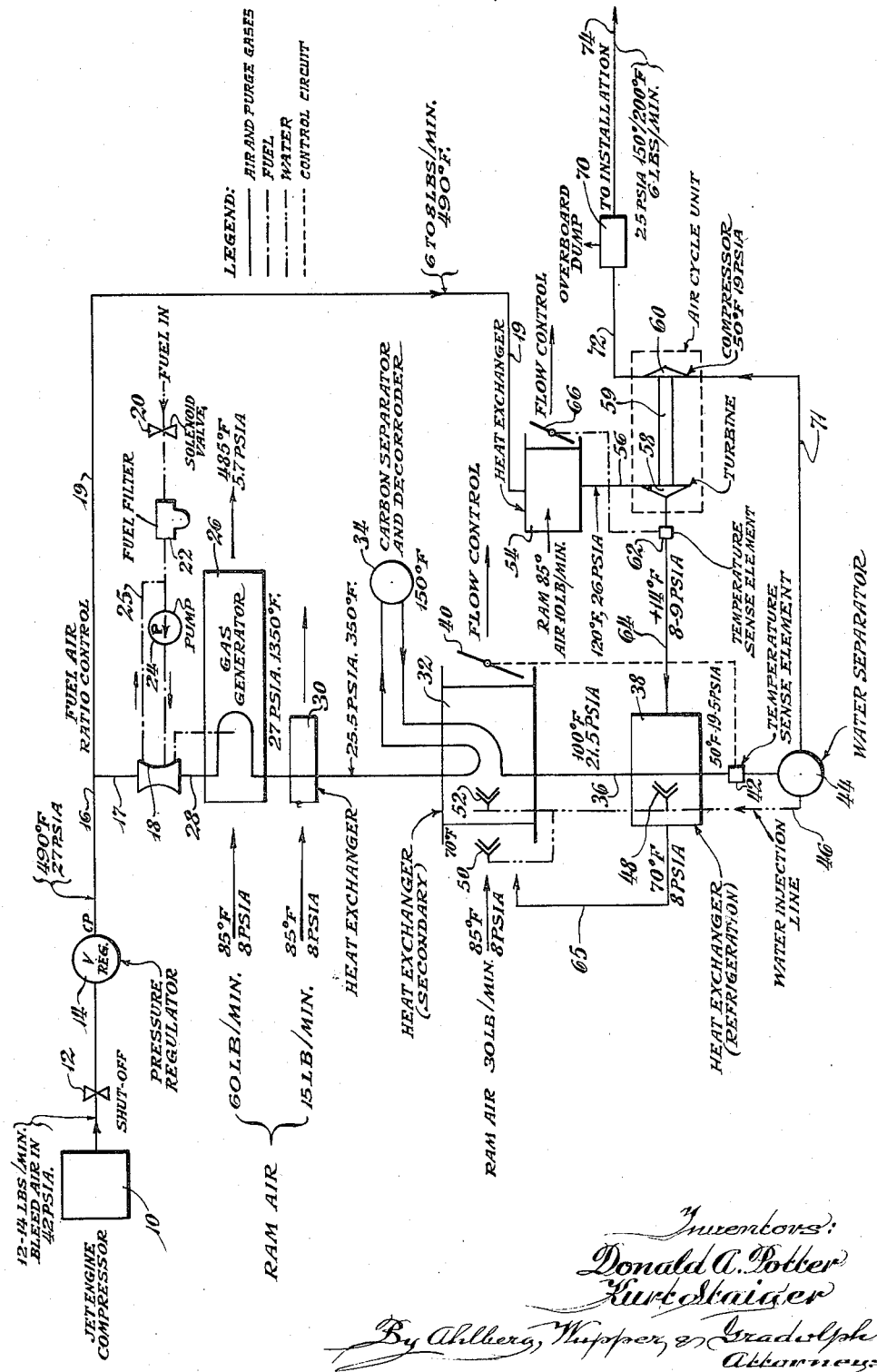

2,944,987

METHOD AND MEANS FOR GENERATING PURGE GASES

Donald A. Potter and Kurt Staiger, Indianapolis, Ind., assignors to Stewart-Warner Corporation, Chicago, Ill., a corporation of Virginia Filed Dec. 27, 1955, Ser. No. 555,361

6 Claims. (Cl. 252—372)

Our invention relates generally to apparatus for the production of inert purge gases (principally carbon dioxide and nitrogen) to replace fuel withdrawn from the tanks of aircraft, and also for supply to other compartments of aircraft wherein there is a possibility of explosion.

In the operation of aircraft, it is desirable to reduce the possibility of explosion or fire upon accidental collision or crash landings, by providing means for supplying to the fuel tanks and other vulnerable compartments of the airplane, an inert gas, and it is the prime objective of the present invention to provide improved means and improved method for accomplishing this result by supplying cleaned products of combustion of fuel at controlled pressure, temperature, and humidity.

A further object is to provide means and a method for utilizing water vapor condensed from the products of combustion, as means for cooling the products of combustion.

It is a further object to provide, in a purge gas producing system, a turbine operated compressor for increasing the temperature and pressure of inert gases supplied to fuel tanks and the like of an aircraft.

A further object is to provide an improved apparatus for supplying inert purging gas to aircraft fuel tanks and the like, in which the purging gas is reduced in temperature sufficiently to cause substantial condensation of water vapor contained therein, and in which controls are provided to prevent freezing of the water condensate.

A further object is to provide an improved purge gas generating system in which the purging gas is reduced in temperature to a value such that chemical means may be employed to eliminate therefrom any aciduous constituents of the gas.

A further object is to provide a purge gas generating apparatus capable of producing inert gas which has a low dew point on the order of 50° F.; at a pressure of approximately 25 pounds per square inch atmospheric; at a temperature of between 150° and 200° F.; at a rate of at least six pounds per minute when the plane upon which the equipment is installed is operating at an altitude of 25,000 feet at a maximum atmospheric temperature of 85° F.; and which contains less than 4% of oxygen, less than .5% of hydrogen, and less than 3% of carbon monoxide.

Other objects and advantages will appear from the following description, reference being had to the accompanying drawing which is a flow diagram illustrating the method and apparatus by which the foregoing objectives are accomplished.

In the drawing, the flow of air and products of combustion are shown in full lines; that of fuel is indicated by dash-dot lines; that of water by dash and double dot lines, and control circuits by dash lines.

Throughout this application it will be assumed that the system and apparatus, when in operation, will use from 12 to 14 pounds per minute of air supplied by a compresser at a pressure of approximately 42 pounds per square inch absolute (42 p.s.i.a.), and will utilize approximately 115 pounds of air per minute at about 85° F., and at 9.2 p.s.i.a., supplied by a ram or rams for the four heat exchangers employed, when the aircraft is flying at an altitude of 25,000 feet at a .9 Mach speed, under "Army Summer Day Conditions." Bleed air temperature from the engine will be at 490° F. at a pressure of 42 p.s.i.a. The pressure of the purge gas leaving the unit shall be limited to 25 p.s.i.a. by the dump valve 70, and shall be supplied at a rate of six pounds per minute. (At 45,000 foot altitude, the rate will drop to about two pounds per minute.)

The flow diagram shown includes numerous legends clearly identifying the various elements and indicating the pressures and temperatures and flow rates. The air which is to be used for combustion of the fuel is bled from the compressor of the aircraft engine and controlled by a shutoff valve 12, and flows through a pressure regulating valve to a conduit 16 having branch conduits 17 and 19. As indicated, the temperature in this conduit 16 may be in the order of 490° F. at a pressure of 27 p.s.i.a. Air is supplied from the conduit 16 to a fuel-air ratio control apparatus 18, to which fuel is supplied through a fuel controlling solenoid 20, a filter 22, and a fuel pump 24.

Excess fuel supplied to the fuel-air ratio control apparatus 18 is returned to the intake of pump 24 through a conduit 25.

The fuel from the fuel-air ratio control device 18 is supplied to a sealed combustion heater or inert gas generator 26, which may be of the type disclosed in the patent to Potter and Geisler, No. 2,759,802, issued August 21, 1956, and which is supplied with the combustion air through a conduit 28. This gas generator 26 receives cooling air from a suitable ram at an assumed temperature of 85° F., at a pressure of 8 p.s.i.a., and at a rate of 60 pounds per minute. As a result, the exhaust of the gas generator 26 will be at a pressure of approximately 27 p.s.i.a and at a temperature of approximately 1350° F.

It is desirable, to prevent corrosion of conduits and other apparatus through which the products of combustion must flow, that acid and carbon constituents be eliminated from the products of combustion. The present known chemical means for neutralizing the acid constituents of the exhaust gas are effective only at temperatures not much greater than 150° F. It is therefore essential to cool the products of combustion generated in the gas generator 26 to a temperature at which the chemical decorroding agents may be effective. This is accomplished by a second heat exchanger 30, which in practice may constitute a second pass of the heat exchanger of gas generator 26, which is supplied with cooling ram air at the assumed temperature of 85° F. and a pressure of 8 p.s.i.a., and at a flow rate of 15 pounds per minute. The purge gas discharged from the heat exchanger 30 will therefore have a temperature of approximately 350° F. and a pressure of approximately 25.5 p.s.i.a. This discharge from the heat exchanger 30 is supplied to a secondary heat exchanger 32 by which the temperature of the gas is reduced to approximately 150° F. and supplied to a carbon separator and decorroder 34 at approximately 150° F. by which any carbon particles are removed and any acids in the gas are neutralized.

The secondary heat exchanger 32 is supplied with cooling ram air at the assumed temperature of 85° F., at a pressure of 8 p.s.i.a., and at a rate of approximately 30 pounds per minute. Water injection to supplement the cooling effect of the ram air is supplied, as will appear hereinafter.

After having passed through the carbon separator and decorroder 34, and the secondary heat exchanger 32, the purge gas flows through a conduit 36 to a refrigerating heat exchanger 38. The flow of cooling air through the secondary heat exchanger 32 is controlled by a damper 40 which is a servomechanism operated in response to the temperature of the purge gas output of the refrigerating heat exchanger 38. The purge gas output of the secondary heat exchanger 32 may, for example, have a temperature of 100° F. at a pressure of 21.5 p.s.i.a., and the control 42 for the damper 40 may well be adjusted so that the output gases from the refrigerating heat exchanger 38 is at a temperature of 50° F. at approximately 19.5 p.s.i.a. Thus the purge gas output of the refrigerating heat exchanger 38 is maintained at a sufficiently high temperature to prevent freezing. After passing through the temperature sensitive regulating control 42 the purge gas is supplied to a water separator 44, which is effective to remove a very large portion of the water content of the purge gas.

The condensed water is supplied through a conduit 46 to the refrigerating heat exchanger 38, being sprayed upon the cooling tubes thereof by a nozzle device 48, and is also supplied through nozzles 50 and 52 to the secondary heat exchanger 32 to improve the cooling effected thereby due to the utilization of the latent heat of evaporation.

In addition to supplying bleed air from the compressor to the above described flow line, such air is also conducted through conduit 19 to a heat exchanger 54 which is cooled by the flow of air from a ram, at the assumed temperature of 85° F., at a rate of approximately 10 pounds per minute. The bleed air has its temperature reduced by the heat exchanger 54 to a value of approximately 120° F., and the pressure drop through this heat exchanger amounts to about 1 p.s.i.a., so that the outlet pressure is approximately 26 p.s.i.a.

The air output of the heat exchanger 54 is supplied through a conduit 56 to a gas turbine 58 which is mechanically coupled to a compressor 60, as by a shaft 59, which may include speed change gearing. The discharge of the turbine 58 is conducted through a temperature responsive control element 62 and a conduit 64 to the refrigerating heat exchanger 38. The pressure of the air passing through conduit 64 may be approximately 8 or 9 p.s.i.a. The conversion into mechanical energy of the (heat and pressure) energy of the air supplied through the conduit 56 to the turbine 58, results in the reduction in temperature of the air flowing through conduit 64 to approximately 14° F., and makes possible the refrigeration, or cooling, of the gases of combustion flowing through heat exchanger 38 to the relatively low temperature of approximately 50° F.

The temperature responsive device 62 operates to control a damper means 66 for determining the rate of cooling air flow through the heat exchanger 54, which as previously indicated, is provided with cooling air from a suitable ram at a temperature of 85° F. at a rate of approximately 10 pounds per minute. Thus the temperature at which coolant air is supplied to turbine 58, and hence to the refrigerating heat exchanger 38, is controlled.

To reduce the amount of coolant air required for the secondary heat exchanger 32, the coolant air from the refrigerating heat exchanger 38 is supplied at approximately 70° F. at 8 p.s.i.a. to the secondary heat exchanger 32 through a conduit 65, thereby to supplement the cooling air supplied to the heat exchanger from a ram at the assumed temperature of 85° F. and at a pressure of 8 p.s.i.a.

After the purging gas has passed through the water separator 44 it flows to the centrifugal compressor 60 through a conduit 71, the output of the compressor being inert gases, not containing more than about 4% of oxygen, supplied to a regulating device 70 through a conduit 72, in which the pressure may be in the order of 25 p.s.i.a., the temperature 150° to 200° F., at a rate of approximately 6 pounds per minute. The thus cleaned, dehumidified, and reheated purge gases are then conducted to the fuel cells or other compartments of the aircraft in which it is desired to maintain a nonflammable, nonexplosive atmosphere, such connection being made through a conduit 74.

It will be observed that the purge gas generating system above described has the peculiar advantage that the products of combustion of an inert gas generator are first cooled to a temperature at which the acid components may be neutralized by commercially available chemical alkaline filtering means, whereby the corrosive components of the products of combustion are eliminated, that is, by the carbon separator and decorroder 34. Thereafter, the purge gases are successively cooled and refrigerated to facilitate separation of water vapor therefrom. It is important to note that such cooling shall not reduce the temperature to or below 32° F., which would result in freezing or frosting. The apparatus disclosed herein is designed to cool the exhaust gases to a temperature of approximately 50° F., which allows a safe margin against frosting and freezing.

It should further be noted that bleed air from the jet engine compressor, after being cooled in a heat exchanger 54, is utilized to operate a turbine 58, which, by means of the compressor 60 driven thereby, is effective to increase the temperature and pressure of the purge gas delivered from the water separator 44 so that when it is supplied to the fuel cells or other compartments of the aircraft, it will be effective to prevent combustion of vaporized fuel which may be contained therein.

The temperature of the purge gas supplied to the installation will be between 150° and 200° F. at a pressure of 25 p.s.i.a. and at a rate of 6 pounds per minute, assuming that the aircraft is operating at an altitude of approximately 25,000 feet at .9 Mach flight speed, and that the ambient temperature is no higher than 85° F. At higher altitudes the rate of air flow will necessarily be reduced so that, for example, at an altitude of 45,000 feet the flow may be reduced to approximately 2 pounds per minute.

For convenience of installation in an aircraft, the apparatus is preferably made in two units, one including the heat exchanger 30 and all elements of the apparatus through which the flow of fuel air and products of combustion preceding the flow through this heat exchanger, there being a separable connection in the conduit connecting the purge gas flow from heat exchanger 30 to the secondary heat exchanger 32, and also a separable connection in the conduit 19 leading to the heat exchanger 54.

The purge gas output supplied to the installation through the conduit 74 will have no more than four percent oxygen, five-tenths of a percent of hydrogen, and three-tenths of a percent of carbon monoxide, the balance being carbon dioxide and the inert atmospheric gases, and the water content will not be more than that which would condense therefrom at 50° F., thus assuring that the condensation within the tanks and compartments of the aircraft will be so slight as not to be disadvantageous.

The pressure within the conduit 71 may be of any convenient value, because the pressure at which the purge gas is supplied to the fuel tanks or compartments of the plane may be increased to the required value by proper design of the purge gas compressor 60, and thus compensation may be made for the pressure drop of the purge gas through the several heat exchangers and the water separator 44.

The values of pressure, temperature, and flow rate set forth herein are merely representative of those employed in a typical system, and naturally would be different when the apparatus is adapted for aircraft of different sizes, or operating at different speeds, or at different altitudes than those for which the system and apparatus described herein were designed. In many cases the units have been described as connected by "conduits," although in many instances the units will be compactly arranged and no actual conduits may be present inasmuch as the flow may be merely through apertures in the abutting casings of the units.

While we have shown and described a preferred embodiment of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. The method of producing a relatively dry and inert gas for the purging of fuel cells of aircraft employing an air compressor, which comprises, bleeding some of the output of the aircraft compressor at a relatively high temperature and at a controlled pressure, mixing some of the air bled from the compressor with a liquid fuel, burning the fuel-air mixture in a gas generator, using ram air to cool the products of combustion to a temperature at which chemical decorroding agents are effective to neutralize acidous gases in the products of combustion, passing the products of combustion through a means for removing the acidous components thereof, cooling and using the remaining portion of air bled from the aircraft air compressor as a source of power for driving a turbine, using the exhaust from said turbine to cool the neutralized products of combustion to a low temperature slightly above the freezing point of water, removing a substantial portion of the water content, and by means of an air compressor driven by the turbine compressing and reheating the gases from which a substantial portion of the moisture has been removed.

2. The method as set forth in claim 1 further including the step of automatically controlling the degree of cooling of that portion of the bleed air supplied to the turbine by temperature-sensitive means located at the turbine exhaust and affected thereby.

3. The method set for in claim 1, further including the step of automatically controlling the degree of cooling of the gas after removal of the acidous components thereof by temperature-sensitive means positioned in said gas flow line between said means for removing the acidous components thereof and said means for removing a substantial portion of the water content, said temperature-sensitive means being positioned immediately before said means for removing a substantial portion of the water content.

4. An apparatus for generating an inert and low humidity purge gas for aircraft having air compressors, means for bleeding a quantity of the compressed air output of the air compressor at a controlled pressure, liquid fuel supply means, means for mixing and controlling the ratio of a supply of fuel from said fuel supply means and a portion of said compressed bleed air, a gas generator for burning the fuel-air mixture, ram air supply means for cooling the gases generated by the generator, cleaning means for removing carbon and corrosive components from the products of combustion of the gas generator, first heat exchanger means connected to receive air from the means for bleeding air from the aircraft air compressor and connected to be cooled by the ram air supply means, a gas turbine connected to said first heat exchanger means to be operated by the cooled air output of said first heat exchanger means, second heat exchanger means receiving exhaust air from said turbine for cooling the gas discharged from the cleaning means to a temperature slightly above the freezing point of water, a water separator connected to said second heat exchanger means, a gas compressor mechanically coupled to the gas turbine to be driven thereby and having its inlet connected to receive dried purge gas from said water separator, and conduit means to conduct the output of the latter compressor to spaces within the aircraft to be purged.

5. The combination set forth in claim 4, in which purge gas said second heat exchanger means comprises two heat exchange devices connected in series with respect to the flow of the products of combustion, and in which means are provided to conduct the air discharged from the turbine as a coolant first through the second of the heat exchange devices and then through the first of the heat exchange devices.

6. The combination set forth in claim 4, in which means are provided to control the rate of flow of cooling air through said first heat exchanger means in response to the temperature of the exhaust air from the turbine.

References Cited in the file of this patent

UNITED STATES PATENTS

| | | |
|---|---|---|
| 1,356,888 | Shea | Oct. 26, 1920 |
| 2,743,163 | Bunsen et al. | Apr. 24, 1956 |
| 2,743,997 | Geisler | May 1, 1956 |
| 2,756,215 | Burgess et al. | July 24, 1956 |
| 2,758,914 | King | Aug. 14, 1956 |
| 2,759,802 | Potter et al. | Aug. 21, 1956 |
| 2,787,530 | Staiger | Apr. 2, 1957 |